July 7, 1970     D. M. PETERSON ET AL     3,519,162
CASING CONSTRUCTION FOR PHOTOGRAPHIC APPARATUS SUCH AS A CAMERA
Filed Jan. 18, 1967
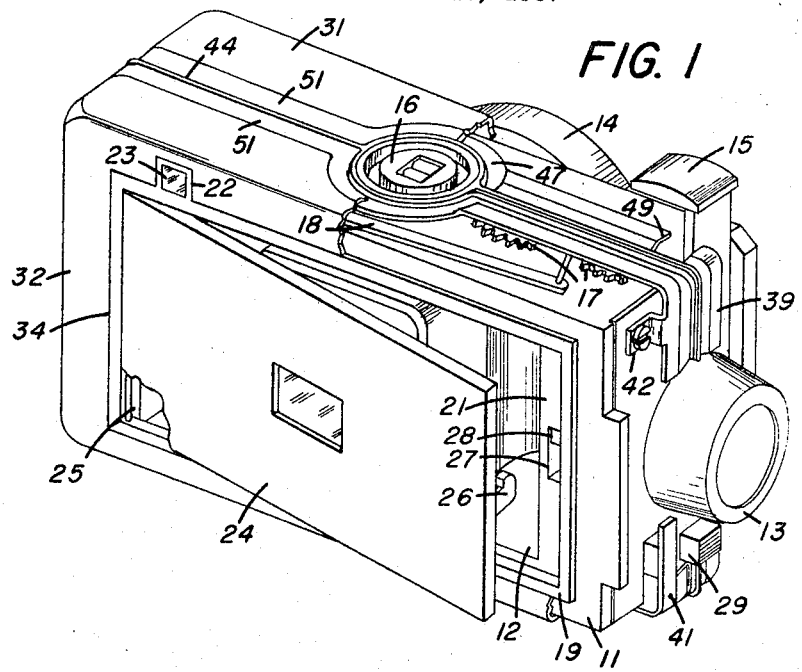
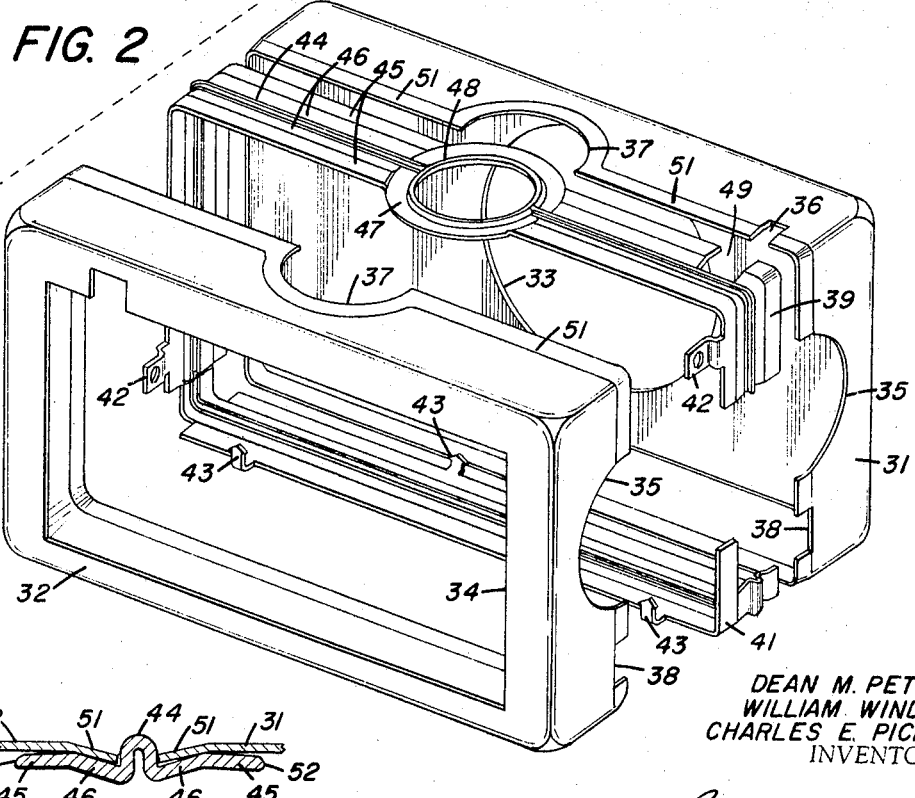
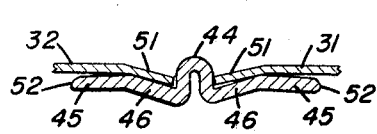
DEAN M. PETERSON
WILLIAM WINDLE, JR.
CHARLES E. PICKERING
INVENTORS
BY
ATTORNEYS United States Patent Office 3,519,162
Patented July 7, 1970

1

3,519,162
CASING CONSTRUCTION FOR PHOTOGRAPHIC APPARATUS SUCH AS A CAMERA
Dean M. Peterson, William Windle, Jr., and Charles E. Pickering, Rochester, N.Y., assignors to Eastman Kodak Company, Rochester, N.Y., a corporation of New Jersey
Filed Jan. 18, 1967, Ser. No. 610,089
Int. Cl. B65d 7/12; G03b 17/02
U.S. Cl. 220—4     4 Claims

ABSTRACT OF THE DISCLOSURE

A light-tight boxlike casing adapted to enclose an internal body member of photographic apparatus such as a camera or similar article and retained thereon only by an inwardly inclined peripheral lip on the casing edge cooperating with mating circumferential surfaces on the body member.

---

The present invention relates to photographic apparatus, and more particularly to casing construction for such apparatus.

In photographic apparatus such as still and movie cameras provided with an external boxlike casing, the known means for attaching one or more casing members to the internal body structure of the camera comprises the use of screws, rivets, bent-over tabs, heat deformable plastic lugs or other similar conventional fastening means, all of which involve locating the casing in its installed position and thereafter performing a second manipulative operation to secure the casing in that position. Furthermore, such fastening means in many instances complicate or preclude subsequent removal of the casing to service or repair the camera. For example, even when removable screws are used to hold the casing in place, such screws often are covered by a layer of leather or other decorative covering material by adhesive or the like, and the material must be peeled back to gain access to the screws for the purpose of removing the casing.

According to the present invention, these various disadvantages inherent in prior casing construction are eliminated by means of a light-tight casing structure comprising preferably two opposed boxlike casing members provided with inwardly directed peripheral edge portions at the open end of each casing. The casing edge portions are adapted to snap into resilient, retaining engagement with corresponding surfaces in circumferential relation to the body member. These latter surfaces might be formed integrally with the body member, but, in a preferred embodiment of the invention, are defined by one or more metal strap members attached to the body member by means that will be concealed by the installed casing.

In addition to simplifying casing construction as well as assembly and disassembly of the photographic apparatus, the preferred means of practicing the invention also serve to provide a decorative joint between the two casing members, concealing the adjacent edge surfaces thereof and minimizing the possibility of light and/or dust entering the interior of the apparatus camera. Furthermore, since the casing members are retained in place entirely by their internal edge surfaces, the entire visible external areas of the casing members may be decoratively finished when the members are formed to provide an attractive appearance without the need for finishing operations after assembly.

The means by which these and other objectives are realized in accordance with the invention will be apparent from the following detailed description, reference being made to the accompanying drawings in which:

FIG. 1 is a perspective rear view of a camera according to a preferred embodiment of the invention, with portions thereof broken away for illustrative purposes;

FIG. 2 is a perspective exploded view corresponding to FIG. 1, showing the camera casing members and the circumferential strap members associated therewith; and FIG. 3 is a cross sectional view taken transversely of the upper strap member, showing its cooperating relation with the edge portions of the assembled camera casing members.

As shown in FIG. 1, the internal body member of the illustrated camera is indicated by numeral 11 and comprises a metal or plastic structure defining the interior film compartment 12 of the camera and serving to support various conventional components accessible from outside the camera casing, representative of which are winding knob 13, lens housing 14, trigger 15, and a rotatable socket 16 that receives a flashcube. The internal body member 11 also serves to support the internal camera mechanisms, as suggested by gears 17 that rotate the socket 16 and by a lever arm 18 that controls film wind. The back portion of member 11 defines a continuous rectangular lip 19 surrounding a recessed wall surface 21 circumferentially adjacent the rearward opening of the film compartment 12, the lip extending upwardly as shown at 22 to support a viewfinder lens 23. A cover door 24 for access to the film compartment 12 is supported by a hinge pin 25 for movement to a closed position in which the door is adjacent surface 21 and substantially flush with lip 19. To retain the door 24 in closed condition, a latch member 26 on the door enters slot 27 and is engaged by a latching pawl 28 which is releasable to open the door by means of a latch release button 29 at the end of the camera. By this arrangement, the interior film compartment 12 can be made entirely light-tight, if necessary, without regard to the external camera casing.

According to the present invention, the camera casing comprises a front casing member 31 and a rear casing member 32, each of which has a generally open-ended, boxlike configuration with an end front or rear wall and four lateral-side walls extending therefrom. Each casing member is formed preferably of resilient light-gauge sheet metal stamped or drawn to shape to avoid joints at the corners. By the use of sheet metal stock supplied with a decorative surface such as a vinyl plastic coating that simulates leather, the desired external surface appearance of the casing members can be achieved without supplemental finishing operations. After the members are drawn or stamped, they are completed by punching or cutting out the various openings through which elements of the camera project externally of the casing. In the front and rear walls of the casing members, such openings comprise apertures as shown at 33 and 34 to receive respectively the forwardly extending lens housing 14 and the rearwardly projecting lip 19 surrounding the cover door 24. In the lateral wall portions of the casing members, similar openings are formed contiguous with the adjacent edges of the casing walls to accommodate laterally projecting elements of the camera, as illustrated by winding knob 13, trigger member 15, socket member 16 and latch release button 29. These openings are shown at 35, 36, 37 and 38, respectively.

To support the casing members on the camera body member 11, a pair of rigid metal casing support straps or frame members 39 and 41 are mounted in fixed relation to the body member circumferentially thereof. For example, the mounting may be by means of screws threaded into the body member 11 through ears 42, as shown on the top strap member 39, or, by means of lugs 43, shown on the bottom strap 41, which are forced into preformed mating holes in the body member 11, or are heated and pressed into position if the body member is formed of a thermoplastic material. Each of the casing support straps is profiled as shown in FIG. 3 to define a semicylindrical central ridge 44 connected to the lateral edge portions 45 of the strap by inwardly sloping intermediate strap areas 46. As shown at 47, the upper strap 39 includes a circular ring area including a raised ridge 48, comprising a continuation of ridge 44, which surrounds and, if desired, serves as a bearing support means for the rotatable socket 16. As is apparent from the illustrated notch 49, provided to accommodate the trigger member 15, the edge and intermediate portions 45, 46 of the straps need not be continuous so long as the continuous ridge portion 44 is not defaced and the rigidity of the straps is preserved.

Along the open ends of each casing member 31, 32, the marginal portions of the lateral casing walls around the entire periphery of each casing member are sloped inwardly as shown at 51, at an angle corresponding generally to the inward slope of the intermediate areas 46 of the strap members. This construction, therefore, allows the casings to be installed in overlying relation to the support straps or frame members merely by being snapped onto the strap members, as facilitated by the slight inward angularity of the edge portions 45 and/or the slanted edge surfaces 52 thereof. When the casings have been so installed, they are retained in position only by the resilient engagement of the sloped marginal areas 51 with the strap members, with the extreme edges of the casing walls abutting against the side surfaces of ridge 44, as shown in FIG. 3. Thus, the casing members may be removed by being pulled away from the strap members with sufficient force to spring the marginal portions of the casings out of such engagement with the support straps.

In addition to the obvious advantages afforded by this construction from the standpoint of simplifying the fabrication, assembly and servicing of the camera, it should be noted that the rigid portion of the support straps provides a smooth decorative bead around the assembled camera, which conceals the adjacent raw edges of the casing members and decreases the likelihood of light and/or dust entering the interior of the camera along these edge surfaces. If desired, the strap members may be polished, plated, painted, anodized or treated in any other appropriate manner to produce an attractive aesthetic appearance, any of which operations can be performed prior to assembly of the camera.

While the illustrated camera employs forward and rearward casing members, it should be apparent that the apparatus might be provided with corresponding upper and lower casing members, in which case the support straps would be located horizontally about the girth of its body. Alternatively, the same general mode of construction might be embodied in the apparatus comprising only one removable casing member, with the opposite external surfaces being defined by the body portion itself or by a permanently mounted casing structure. Additionally, the casing supporting surfaces might be molded or otherwise formed integrally with the internal body member, rather than by separate strap members, particularly in inexpensive cameras employing relatively simple internal mechanisms that would not interfere with or unduly complicate the fabrication of the casing support surfaces.

The invention has been described in detail with particular reference to a preferred embodiment thereof, but it will be understood that variations and modifications can be effected within the spirit and scope of the invention as described hereinabove and as defined in the appended claims.

We claim:
1. In a casing structure for a photographic camera having an internal body member supporting camera operating mechanism and external camera elements, the improvement comprising:
  (a) a pair of casing members of open-ended boxlike configuration enclosing the body member, the casing members being oriented in opposed relation relative to each other;
  (b) means defining apertures in said casing members through which the external elements project;
  (c) means defining inwardly inclined, resilient internal surfaces on said casing members adjacent the open ends thereof; and
  (d) casing support means comprising an elongated strap member rigidly supported on said body member, said strap member including:
    (1) a central portion formed to define an outwardly extending smooth rib disposed longitudinally of said strap between and in lateral abutment with the open ends of said casing members, and
    (2) support means on opposite sides of said rib, said support means defining surfaces inclined outwardly for engaging said inwardly inclined internal surfaces of said casing members to retain said casing members over said body member.

2. Photographic apparatus including operating mechanism and comprising:
  (a) an internal body member for supporting the operating mechanism,
  (b) casing means adapted to enclose said body member and operating mechanism comprising:
    (1) a resiliently deformable front casing member for receiving a front portion of said body member,
    (2) a resiliently deformable rear casing member for receiving a rear portion of said body member,
    (3) wall means defining inwardly directed internal surfaces at the respective open ends of said casing members, and
  (c) casing support means retaining said casings in installed position on said body member with the open ends of said casing members in aligned adjacent relation to one another, said support means comprising:
    (1) at least one strap member rigidly attached to said body member and extending about the periphery of said body member,
    (2) a central rib defined by said strap member extending outwardly therefrom between the open ends of said casing members, and
    (3) casing support surfaces defined by said strap members along opposite sides of said rib and resiliently engaged by said inwardly directed internal surfaces of said casing members to latch said casing members to the body member.

3. The invention defined by claim 2 in which said inwardly directed surfaces are defined by inwardly bent marginal portions of said casing members extending about the open ends thereof.

4. In a casing structure for a photographic camera having an internal body member supporting camera operating mechanism and external camera elements, the improvement comprising:
  a casing member of open ended box-like configuration enclosing a portion of the body member;
  means defining an aperture in said casing member through which the external elements project;
  means defining resilient internal surfaces on said casing members adjacent the open end thereof; and
  casing support means comprising an elongated strap member rigidly supported about the periphery of said body member, said strap member including resilient longitudinally oriented surfaces mateable with said resilient internal surfaces on said casing members to hold said casing member to said body member.

References Cited

UNITED STATES PATENTS

| 2,364,083 | 12/1944 | Lindsay | 220—80 X |
| 2,804,559 | 8/1957 | Brewer | 220—80 X |
| 2,506,863 | 5/1950 | Fassin | 95—11 |
| 3,117,691 | 1/1964 | Williams | 220—60 |
| 3,358,574 | 12/1967 | Liverano | 95—11 |

GEORGE E. LOWRANCE, Primary Examiner

U.S. Cl. X.R.

95—11; 220—80